United States Patent
Hiller et al.

(10) Patent No.: US 11,136,203 B2
(45) Date of Patent: Oct. 5, 2021

(54) MATERIAL DIVERTER AND SEPARATOR

(71) Applicant: Sesotec GmbH, Schönberg (DE)

(72) Inventors: Michael Hiller, Kirchberg (DE); Stefan Ertl, Rinchnach (DE)

(73) Assignee: Sesotec GmbH, Schönberg (DE)

( * ) Notice: Subject to any disclaimer, the term of this patent is extended or adjusted under 35 U.S.C. 154(b) by 0 days.

(21) Appl. No.: 17/025,369

(22) Filed: Sep. 18, 2020

(65) Prior Publication Data

US 2021/0087002 A1    Mar. 25, 2021

(30) Foreign Application Priority Data

Sep. 20, 2019 (EP) .................................. 19198661

(51) Int. Cl.
| B65G 51/24 | (2006.01) |
| B65G 53/56 | (2006.01) |
| B65G 53/52 | (2006.01) |

(52) U.S. Cl.
CPC .......... *B65G 53/56* (2013.01); *B65G 53/521* (2013.01); *B65G 2203/0283* (2013.01); *B65G 2203/042* (2013.01)

(58) Field of Classification Search
CPC ..... B65G 11/12; B65G 11/123; B65G 11/126; B65G 51/14; B65G 51/24; B65G 53/66; B65G 2203/042; B65G 2203/0283; Y10S 209/911; Y10T 137/87788; Y10T 137/87812; Y10T 137/87804
USPC ................... 406/3, 181, 182; 209/655, 911; 137/875; 193/31 A; 198/442
See application file for complete search history.

(56) References Cited

U.S. PATENT DOCUMENTS

| 3,762,664 | A | * | 10/1973 | Loveless ............... | B65G 51/24 |
| | | | | | 406/182 |
| 3,771,560 | A | * | 11/1973 | Conti ................... | B65G 53/56 |
| | | | | | 137/874 |
| 3,902,682 | A | * | 9/1975 | Woll .................... | B65G 51/24 |
| | | | | | 406/182 |
| 3,922,019 | A | * | 11/1975 | Montgomery, Jr. ... | B65G 53/56 |
| | | | | | 406/182 |

(Continued)

FOREIGN PATENT DOCUMENTS

| DE | 9104817.6 | 9/1991 |
| DE | 102007015733 | 11/2007 |

(Continued)

*Primary Examiner* — Joseph A Dillon, Jr.
(74) *Attorney, Agent, or Firm* — Erickson Kernell IP, LLC; Kent R. Erickson

(57) ABSTRACT

A material diverter for separating bulk goods includes a housing containing an inlet and at least two outlets, as well a guide element located between the inlet and the outlets that is pivotable about a pivot bearing in order to guide the material flow to one of the outlets. The material diverter further includes a pivot drive for pivoting the guide element, in order to align it between the inlet and one of the outlets. The housing includes a door that can be moved on the housing or removed therefrom. A first bearing element in the pivot bearing is located on the housing, and a second bearing element in the pivot bearing is located on the door. The guide element is received in the first and/or second bearing element such that it can be removed therefrom to facilitate servicing and cleaning of the material diverter and the guide element.

14 Claims, 2 Drawing Sheets

(56) References Cited

U.S. PATENT DOCUMENTS

| | | | | |
|---|---|---|---|---|
| 3,930,457 A * | 1/1976 | Dedman | | B63J 2/00 |
| | | | | 114/74 R |
| 4,041,762 A * | 8/1977 | Shurtleff | | G01N 1/20 |
| | | | | 73/863.44 |
| 4,057,373 A * | 11/1977 | Schwing | | B65G 53/56 |
| | | | | 417/519 |
| 4,070,961 A * | 1/1978 | O'Rourke | | B30B 9/301 |
| | | | | 100/185 |
| 4,189,261 A * | 2/1980 | Kelley | | B65G 51/32 |
| | | | | 137/874 |
| 4,333,828 A * | 6/1982 | Taylor | | E02F 3/902 |
| | | | | 166/321 |
| 4,459,069 A * | 7/1984 | Ahr | | B65G 51/32 |
| | | | | 406/74 |
| 4,506,703 A * | 3/1985 | Baron | | B08B 9/0323 |
| | | | | 137/625.43 |
| 4,520,847 A * | 6/1985 | Baron | | F28G 1/125 |
| | | | | 137/625.43 |
| 4,543,996 A * | 10/1985 | Baron | | B08B 9/0323 |
| | | | | 137/625.43 |
| 4,552,181 A * | 11/1985 | Hawkins | | A62C 27/00 |
| | | | | 137/615 |
| 4,669,505 A * | 6/1987 | Nelson | | B65G 53/56 |
| | | | | 137/874 |
| 4,938,637 A | 7/1990 | Lybecker et al. | | |
| 5,090,544 A * | 2/1992 | Carroll | | B65G 47/72 |
| | | | | 193/31 A |
| 5,207,536 A | 5/1993 | Beirle et al. | | |
| 5,423,492 A * | 6/1995 | Willis | | G07F 7/0609 |
| | | | | 241/81 |
| 5,875,814 A * | 3/1999 | Osborne | | F04B 7/0084 |
| | | | | 137/375 |
| 5,899,805 A * | 5/1999 | Dowd | | B64D 13/08 |
| | | | | 454/76 |
| 6,155,300 A * | 12/2000 | Gross, Jr. | | F16K 11/065 |
| | | | | 137/625.48 |
| 6,182,699 B1 * | 2/2001 | Hawkes | | F16K 11/052 |
| | | | | 137/861 |
| 7,290,566 B1 * | 11/2007 | Young | | F16K 11/052 |
| | | | | 137/875 |
| 8,082,951 B2 * | 12/2011 | Arsin | | F16K 11/0853 |
| | | | | 137/625.47 |
| 9,187,247 B2 * | 11/2015 | Patton | | B65G 11/206 |
| 9,284,121 B2 * | 3/2016 | Nolin | | B65G 11/126 |
| 2003/0168116 A1 * | 9/2003 | Brenner | | F01N 3/0878 |
| | | | | 137/875 |
| 2004/0069692 A1 * | 4/2004 | Wooldridge | | B07C 5/38 |
| | | | | 209/655 |
| 2006/0086844 A1 | 4/2006 | DeHart | | |
| 2006/0169337 A1 * | 8/2006 | Lopez | | F16K 11/076 |
| | | | | 137/625.47 |
| 2010/0032033 A1 * | 2/2010 | Okabe | | B65G 53/56 |
| | | | | 137/595 |
| 2013/0237140 A1 * | 9/2013 | Contreras | | H02P 23/24 |
| | | | | 454/239 |
| 2014/0110510 A1 * | 4/2014 | Rivir | | B01J 2/20 |
| | | | | 241/27 |
| 2015/0028064 A1 * | 1/2015 | Nolin | | B65G 11/166 |
| | | | | 222/566 |
| 2019/0107215 A1 * | 4/2019 | Zinser | | F16K 11/0833 |

FOREIGN PATENT DOCUMENTS

| | | |
|---|---|---|
| EP | 0148990 | 7/1985 |
| GB | 1032001 | 6/1966 |
| WO | 20190170319 A1 | 9/2019 |

\* cited by examiner

MATERIAL DIVERTER AND SEPARATOR

CROSS-REFERENCE TO RELATED APPLICATIONS

This application claims priority from European Application No. EP 19198661.1 filed Sep. 20, 2019, the contents of which are incorporated herein by this reference.

FIELD

The present invention relates to a material diverter for separating bulk goods.

BACKGROUND

The material diverter has an inlet and at least two outlets, as well as at least one pivotal guide element that can pivot on a pivot bearing between the inlet and the outlets, for selectively guiding the material flow to one of the outlets. The material diverter has a housing, and a pivot drive for pivoting the guide element in order to align this guide element with one of the numerous outlets. Such a material diverter is used in particular in material separating facilities, e.g. for bulk goods in the food industry, as well as non-food industries, e.g. plastic processing, for sorting undesired products, e.g. pieces of metal, out of the material flow. One problem with known material diverters is that the guide element, frequently formed by a tube, easily becomes dirty, and cleaning is difficult.

SUMMARY

It is therefore the object of the invention to create a material diverter of the type specified above, which can be easily cleaned. This object is achieved according to the invention by a material diverter that has the features of claim 1. Advantageous developments of the invention are the subject matter of the dependent claims. Advantageous developments are also described in the description, and illustrated in the drawings.

According to the invention, the housing for the material diverter has a door that is attached to the housing such that it can be moved or removed. A first bearing element in the pivot bearing is located on the housing, and a second bearing element in the pivot bearing is located on the door. The guide element is received in the first and/or second bearing element, preferably in both the first and second bearing elements, such that it can be removed therefrom. When the guide element is only received in the first bearing element, the guide element, e.g. a tube, is moved along with the door, away from the housing, when the door is opened, e.g. in a translatory or pivotal movement. The guide element can then be easily cleaned. The guide element is preferably removably received in both the first and second bearing elements. When the door is then opened, the guide element only remains hanging from the first, housing-side, bearing element, and can be removed therefrom simply by pulling, and then cleaned. The embodiment of the material diverter according to the invention thus enables a simple and effective cleaning, as well as a simple replacement of the guide element. Moreover, after removing the guide element, the housing for the material diverter can also be easily cleaned or inspected and serviced.

In an advantageous embodiment of the invention, the first and second bearing elements on the housing and door are formed by bearing bushings. Bearing pins are then formed on the guide element that extend into the two bearing bushings. The bearing pins can be formed on the opposing ends of a continuous shaft, although this has the disadvantage that the pivot axis must be located on a side wall of the guide element, or else the shaft would pass through the flow diameter of the guide tube, thus impairing the material flow. For this reason, the bearing is preferably formed by two bearing pins when the guide element is formed by a tube, which protrude from opposing side walls of the guide tube, and can therefore be received in the bushings on the housing and the door for the material diverter. In this manner, the interior diameter of the tube remains unobstructed, and the bearing does not affect the material flow through the guide tube.

The pivot drive is preferably connected to the housing or the door of the material diverter, in particular the housing. In this manner, the substantial components are located in a compact manner on the housing for the material diverter. If the pivot drive is mounted on the outside of the housing, the pivot drive can be removed for service or replacement, without having to open the housing for the material diverter. Furthermore, when the pivot drive is mounted on the housing, it is easy to establish a functional connection between the pivot drive and the guide element, e.g. in the above manner, through the formation of a non-rotationally symmetrical profile on the bearing for the guide element, and a complementary profile on the pivot drive.

The pivot drive is preferably connected to the housing wall in which the first bearing element is formed. As a result, the pivot drive will not obstruct the door when it is opened. Furthermore, it is possible to check the functioning of the pivot drive while the door is open, because the guide element remains functionally connected to the pivot drive after the door is opened, and is received in the first bearing element. Moreover, the bearing component in particular can then be removed from the pivot drive and the first bearing element in order to clean or replace it.

In an advantageous development of the invention, the guide element is in the form of a tube. This tube can have a circular or rectangular, e.g. square, cross section, depending on the type of material flow, and the requirements for the facility. The advantage of a tube is that the material flow is well protected from the interior of the housing, such that the housing interior between the tube and the housing is not dirtied by the material. Moreover, by using a tube, the material can be precisely conducted to any one of numerous outlets, in particular if the outlets and the inlet are also tube-shaped and have the same cross section.

There is preferably a separating or guide projection between the outlets, which are formed in particular on the housing for the material diverter, formed in particular as the tip of a tapered fin, which deflects the material flow away from the space between the outlets into the outlets, or one of the outlets, when pivoting the guide tube from a first position to a second, corresponding to the numerous outlets, to prevent clogging of the material diverter, which can happen if material is able to collect in the region of the housing between two outlets.

The inlet and the outlets are formed by tubes, wherein the guide tube, as well as the inlet and outlets, have a rectangular, in particular square, cross section. This has the advantage that in the region of the housing where the outlets are located, the discharge areas of two adjacent outlets are only separated from one another by a long web, on which a separating fin of the type specified above can be readily placed in order to prevent a clogging of the housing for the material diverter.

The pivot axis of the guide element is preferably at its end facing the inlet. This facilitates pivoting the guide element toward any one of the numerous outlets. There are preferably two outlets in the housing for the material diverter. There can also be three or more outlets, depending on the size of the material diverter in relation to the sizes of the outlets. The outlets are preferably located on a curved path encircling the pivot bearing for the guide element.

The housing and/or the door of the material diverter are preferably made of metal. This results in a robust material diverter in which the inlets and outlets can be integrated, such that the material diverter is substantially composed of just the housing with the tube-shaped inlets and outlets, and the guide element pivotally attached thereto, the housing door, and the pivot drive. This material diverter, made entirely of metal, is therefore very robust.

The door is preferably hinged to the housing for the material diverter such that it can pivot. As a matter of course, the door can also be attached to the housing such that it can move outward in a translatory manner, or it can be attached such that it can be readily removed from the housing. In any case, the guide element is exposed when the door is opened or removed, such that it can be more easily cleaned, or even removed from the housing for the material diverter.

In an advantageous development of the invention there is a door sensor connected to the door that is configured to send a status signal to a control unit that deactivates the pivot drive. This ensures that when opening the door on the material diverter, the pivot drive is immediately stopped, to prevent injuring anyone who is handling the open material diverter.

The invention also relates to a separator for bulk goods that comprises a material feed, a conveying path for bulk goods, e.g. a down tube, in which a detector is located for separating at least two types of materials contained in the bulk goods, wherein a pivot drive for a material diverter of the aforementioned type can be actuated on the basis of a signal from the detector such that, when it is actuated, the guide element in the material diverter guides one type of material in a portion of the material flow into a portion of the numerous outlets in the material diverter. In this manner, by combining the material diverter with the detector, a complete separator is obtained, e.g. for sorting out bad elements, e.g. metal, from foodstuffs.

The detector is preferably located in a housing that surrounds a down-tube that ends in the housing for the material diverter. This results in a highly integrated and compact separator in which the detector is coupled directly to the material diverter. The entire separator can thus be placed in a very small space.

A door sensor is preferably located in the door for the housing of the material diverter, which is configured to send a status signal to the control for the separator in order to immediately stop the pivot drive for the material diverter. This substantially improves the safety of the facility.

In particular, the aforementioned separator is used as a metal separator in which pieces of metal can be removed from a non-metal material flow. The detector is therefore a metal detector. As a matter of course, the separator according to the invention can also be used for other materials, e.g. materials containing water, organic materials, or any other materials that can be detected by a detector.

It should not be necessary to point out that the material diverter does not necessarily have only one pivotal guide element. Two or more moving, in particular pivotal, guide elements can be located in the material diverter in order to conduct numerous different materials from multiple feeds or from a single feed into different outlets.

A rinsing device, e.g. spray nozzles, can be placed in the housing for the material diverter for cleaning the interior of the housing for the material diverter between the guide element, if it is tube-shaped, and the housing walls. Spray nozzles are particularly advantageous because a high-pressure water jet provides for a very efficient cleaning of the housing interior. If the guide element is a tube, it can be cleaned by a rinsing device for the tube system in the material flow in the separator.

It should be clear to the person skilled in the art that the embodiments of the invention described above can be combined with one another arbitrarily.

The following expressions are used synonymously: shaft pin—bearing pin; separator—metal remover; guide element—guide tube.

BRIEF DESCRIPTION OF DRAWINGS

The invention shall be described below in reference to the schematic drawings. Therein.

DETAILED DESCRIPTION

Figure 1:
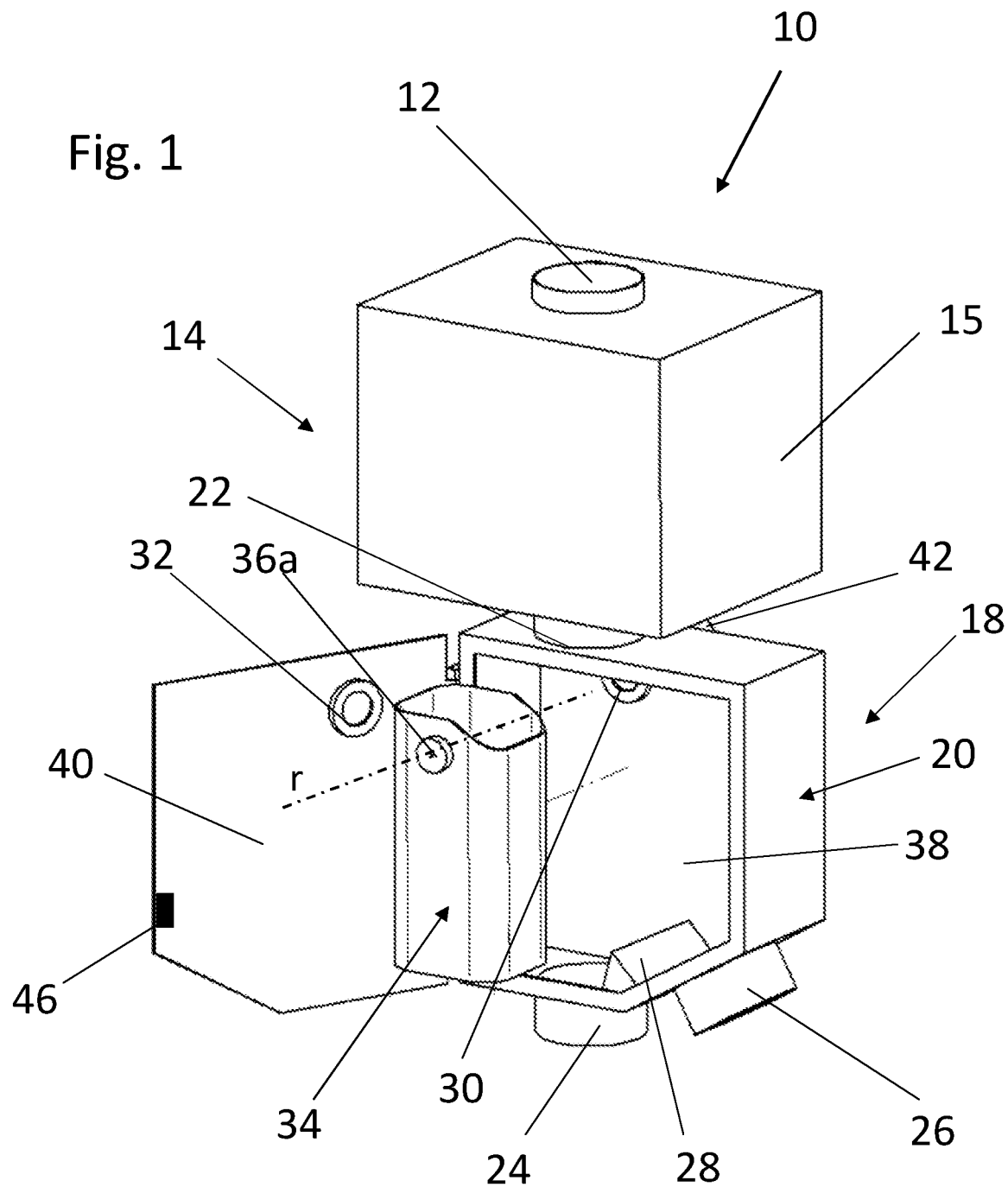
FIG. 1 shows a perspective view of a separator, with the door of the housing for the material diverter open.
Figures 2A, 2B:
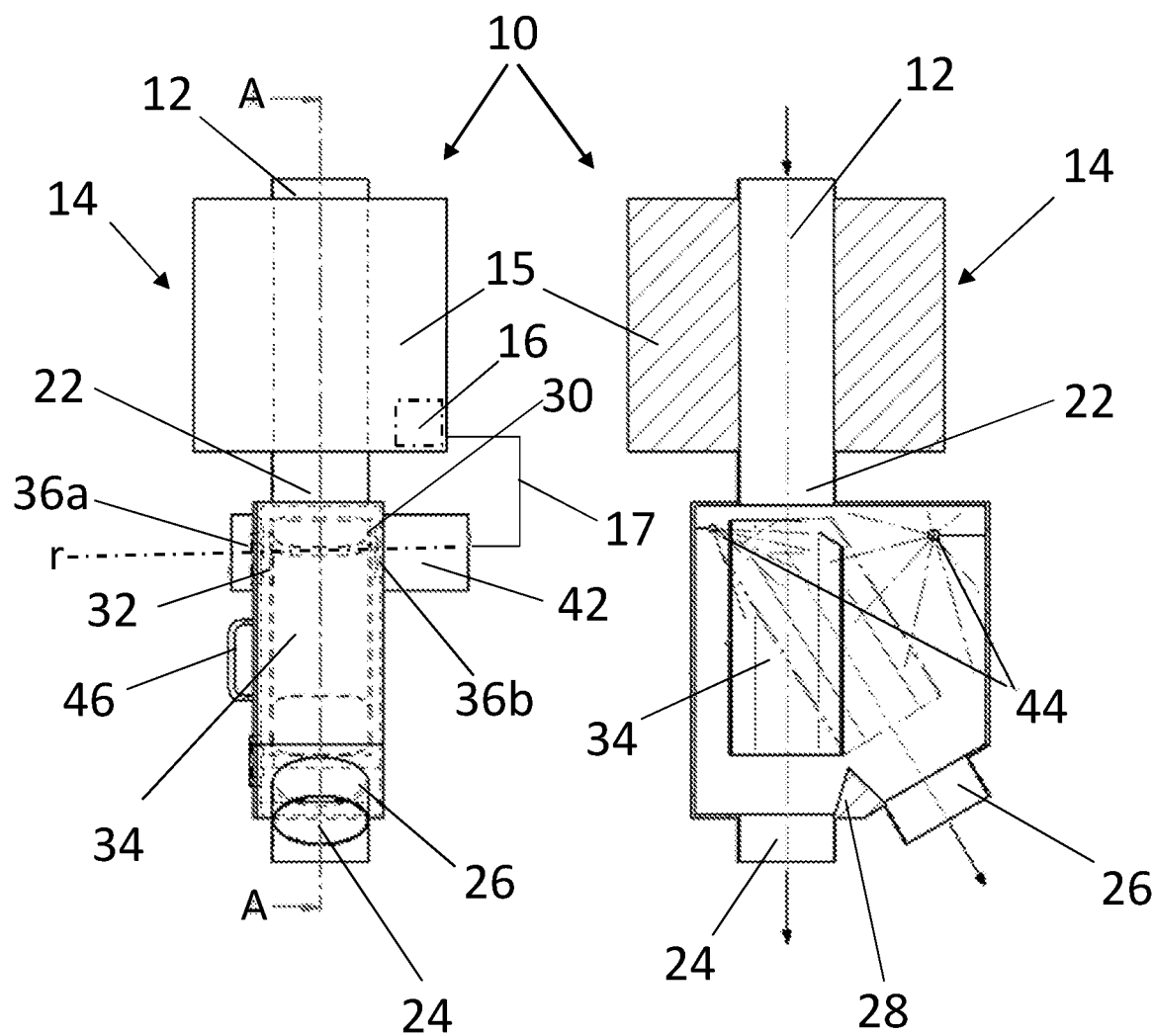
FIG. 2a shows a lateral longitudinal cut through the separator shown in FIG. 1A.
FIG. 2b shows a longitudinal cut through the separator along the line A-A in FIG. 2A.

In conjunction with FIGS. 2a and 2b, FIG. 1 shows a separator 10, which has a down-tube 12 forming a conveying path, which is connected to a detector 14. The separator 10 includes a control unit 16 that can be integrated in the housing 15 for the detector 14. A material diverter 18 that includes a housing 20 in the form of a prism is located at the lower end of the down-tube 12. The lower end of the down-tube 12 thus forms an inlet 22 in the housing 20 for the material diverter 18. The housing 20 has two tube-shaped outlets 24, 26 extending at an angle to one another on its undersurface, which are separated from one another by the tip of a tapered separating fin 28. The angles of the outlets 24, 26 correspond to the alternating angles of two corresponding tangents to a curved path around the pivot axis r of the guide tube 23 at the centers of the two outlets 24, 26.

A guide tube 34 is pivotally supported in the housing 20 by means of two bearing bushings 30, 32 in the housing 20 and the door 40, which engage with the two bearing pins 36a,b, attached to outer walls of the guide tube 34 that are spaced apart from one another. The first bearing bushing 30 is located in the back wall 38 of the housing. A pivot drive 42 is mounted on the outside of this back wall 38, which is functionally engaged with the dedicated bearing pins 36a,b on the guide tube 34 through corresponding engagement profiles, such that the guide tube 34 can rotate about the pivot axis r such that it is aligned with either the first discharge 24 or the second outlet 26. Because the two bearing pins 36a,b are located on the upper end of the guide tube 34, the inlet of the guide tube 34 remains aligned with inlet 22 in the material diverter 18, regardless of whether the lower end of the guide tube 34 is aligned with the first outlet 24 or the second outlet 26. The separating fin 28 ensures that the interior of the housing 20 for the material diverter 18 does not become dirtied with the material that could otherwise collect between the outlets 24, 26, because the material flow that passes through the guide tube 34 between the inlet 22 and the two outlets 24, 26 normally is not interrupted when switching from one outlet 24, 26 to the other.

The housing 20 has a door 40 on its front in which the second bearing bushing 32 for the pivot bearing for the guide tube 34 is located. A handle 46 (FIG. 2a) is formed on the outside of the door 40, so that the door 40 can be easily opened and closed. For cleaning, the door 40 is pivoted to the open position shown therein. In doing so, the second bearing bushing 32 on the door 40 releases the first bearing pin 36a,b, such that the guide tube 34 is only retained by its second bearing pin 36b in the first bearing bushing 30 on the back wall 38 of the housing 20 for the material diverter 18. The guide tube 34 can then be easily removed, such that both the guide tube per se, as well as the interior of the housing 20 for the material diverter, can be cleaned and/or serviced. This also enables a simple replacement of the guide tube 34. By using a guide tube 34 with a substantially square cross section, the region between the two outlets 24, 26 where the separating fin is located can be kept very narrow, in the manner of a web, such large amounts of material cannot collect in the interior of the housing 20 when pivoting the guide tube 34.

FIG. 2b shows optional spray nozzles 44 in a washing device for cleaning the interior of the housing 20 between the guide tube 34 and the inner walls of the housing 20, e.g. with a steam jet or a high pressure water jet. The cleaning can take place both when the guide tube 34 is in the housing 20, i.e. when the housing is closed, as well as when the housing 20 is closed and the guide tube 34 has been previously removed. In this manner, the interior of the housing 20 for the material diverter can be cleaned fully automatically. During this cleaning, the spray nozzles 44 can be actuated when the guide tube 34 is in both of the possible pivotal positions, thus ensuring the most efficient cleaning.

The invention is not limited to the embodiments explained above, and instead can be modified arbitrarily within the scope of the attached claims.

LIST OF REFERENCE SYMBOLS 10 separator—metal remover
12 down-tube—conveying path
14 detector
15 housing for the detector
16 control unit for the separator
18 material diverter
20 prism-shaped housing for the material diverter
22 inlet in the material diverter
24 first outlet in the material diverter
26 second outlet in the material diverter
28 separating fin
30 first bearing bushing, in the rear housing wall
32 second bearing bushing, in the door
34 guide tube—guide element
36a,b bearing pins on the guide tube
38 back wall of the housing for the material diverter
40 door on the housing for the material diverter
42 pivot drive
44 spray nozzles in the washing device for the interior of the material diverter
46 handle, on the door

The invention claimed is:

1. A material diverter for separating bulk goods, which has a housing that has an inlet and at least two outlets, as well as a guide element located between the inlet and the outlets that can pivot by means of a pivot bearing in order to selectively guide the material flow to one of the outlets, wherein the material diverter has a pivot drive for pivoting the guide element in order to align it between the inlet and one of the numerous outlets, characterized in that the housing has a door that is attached to the housing such that it can be moved or removed, in that a first bearing element in the pivot bearing is located on the housing, and a second bearing element in the pivot bearing is located on the door, and in that the guide element is received in the first and/or second bearing element in such a manner that it can be removed therefrom.

2. The material diverter according to claim 1, wherein the first and second bearing elements on the housing and door are formed by bearing bushings, and bearing pins are formed on the guide element, which extend into the two bearing bushings.

3. The material diverter according to claim 2, wherein a sunken and/or raised, non-rotationally symmetric profile is formed on at least one of the bearing pins, which can be brought into engagement with a complementary profile on the pivot drive.

4. The material diverter according to claim 1, wherein the pivot drive is connected to the housing or the door for the material diverter.

5. The material diverter according to claim 4, wherein the pivot drive is connected to the housing wall in which the first bearing element is formed.

6. The material diverter according to claim 1, wherein the guide element is in the form of a guide tube.

7. The material diverter according to claim 6, wherein the inlet and the outlets are formed by tubes.

8. The material diverter according to claim 1 wherein a pivot axis for the guide element lies on its end facing the inlet.

9. The material diverter according to claim 1, wherein the housing and/or the door are made of metal.

10. The material diverter according to claim 1, wherein the door is hinged to the housing such that it can pivot.

11. The material diverter according to claim 1, wherein a door sensor is connected to the door that is configured to deactivate the pivot drive.

12. A separator for bulk goods, comprising a material feed, a conveying path for bulk goods, in which a detector and a control unit are located for separating at least two types of materials contained in the bulk goods, wherein the control unit is configured to actuate the pivot drive in a material diverter according to claim 1 on the basis of a signal from the detector, in order to guide a portion of the material from an inlet in the material diverter into one of numerous outlets in the material diverter by means of the actuation of the guide element.

13. The separator according to claim 12, wherein the detector is located in a housing that surrounds a down-tube, which down-tube ends in the housing for the material diverter and forms the inlet there.

14. The separator according to claim 12 further comprising a door sensor in the door of the housing for the material diverter, which door sensor is configured to send a status signal to the control unit in order to deactivate the pivot drive.

* * * * *